US008671446B2

(12) United States Patent
Hao et al.

(10) Patent No.: US 8,671,446 B2
(45) Date of Patent: Mar. 11, 2014

(54) METHOD AND SYSTEM FOR CONFIGURING A RULE FILE FOR FIREWALL OF WEB SERVER

(75) Inventors: Da Ming Hao, Beijing (CN); Lin Luo, Beijing (CN); Ye Wang, Beijing (CN); Yu Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 891 days.

(21) Appl. No.: 12/500,674

(22) Filed: Jul. 10, 2009

(65) Prior Publication Data

US 2010/0017868 A1    Jan. 21, 2010

(30) Foreign Application Priority Data

Jul. 16, 2008    (CN) .......................... 2008 1 0132452

(51) Int. Cl.
*H04L 29/06*    (2006.01)
*G06F 15/16*    (2006.01)

(52) U.S. Cl.
USPC .................. 726/11; 726/12; 726/13; 726/14; 726/15; 713/168; 713/169; 713/170; 713/171; 713/172

(58) Field of Classification Search
USPC .......................................................... 726/11
See application file for complete search history.

(56) References Cited

U.S. PATENT DOCUMENTS

2006/0294206 A1    12/2006  Graveline et al.
2008/0228911 A1*    9/2008  Mackey ........................ 709/224

FOREIGN PATENT DOCUMENTS

WO    WO2006119479    11/2006

OTHER PUBLICATIONS

Kannan, J., "SemiAutomated Discovery of Application Session Structure", IMC'06, Oct. 25-27, 2006.
Michael Cobb, et. al., "Web application attacks Learning Guide", SearchSecurity.com, 2006, http://searchsecurity.techtarget.com/searchSecurity/downloads/WebappattacksLG.pdf.

* cited by examiner

*Primary Examiner* — Longbit Chai
(74) *Attorney, Agent, or Firm* — Cantor Colburn LLP; Gail Zarick (57) ABSTRACT

A method, a system, and a computer program product embodying computer readable code for configuring a rule file for a Web application firewall. The method includes: blocking a response created by a Web application; modifying the response by adding capturing code for capturing a regular expression and an associated parameter value embedded in the response while being executed; sending the modified response to the browser; receiving a request submitted by the browser and at least one regular expression and an associated parameter value captured by the capturing code; determining a parameter name and a regular expression associated with the same parameter value, and configuring the rule file of the firewall by use of the determined parameter name and regular expression associated with one another as a filtering rule.

17 Claims, 4 Drawing Sheets

METHOD AND SYSTEM FOR CONFIGURING A RULE FILE FOR FIREWALL OF WEB SERVER

CROSS-REFERENCE TO RELATED APPLICATIONS

This application claims priority under 35 U.S.C. §119 from Chinese Patent Application No. 200810132452.X filed Jul. 16, 2008, the entire contents of which are incorporated herein by reference.

FIELD OF INVENTION

The present invention relates to the field of computer network security, and in particular to a method and a system for configuring a rule file for a Web application firewall.

BACKGROUND OF THE INVENTION

With the advancements of computer and Internet technology, network applications, such as online shopping and Internet banking, are becoming increasingly popular. However, attacks on Web applications have become a big threat in the past decade. Even if a firewall has a strong set of rules and a server is duly patched all the time, an attacker may walk right into a system through port 80 when Web application developers do not follow secure coding practice. SQL injection and XSS (Cross-site scripting) are two of the most popular types of attacks. Data in a database may be stolen by SQL injection, and even the whole database can be dumped, which may cause a disaster to some applications. Through XSS, secret data of a normal user may be stolen, for example their user identity or session identity.

Most security vulnerabilities of Web applications result from lack of recheck of submitted values by Web server sites. For example, a developer checks user inputs using a script file only at client sites but the user inputs are not rechecked at the server site. In this case, a malicious user may bypass the verification by the script file at the client site through attacking the client site HTML document or directly building a request using a tool. Therefore, inputs by malicious users may lead to SQL or XSS attacks because of lack of recheck by Web server sites.

Presently, a WAF (Web Application Firewall) is one of the approaches to defend against SQL or XSS attacks. A WAF filters malicious requests before an application server. One of the benefits of a WAF is that filtering rules can be updated at runtime without obtaining or modifying source code so that an application needs not to be redeployed when a new vulnerability is found.

To use a WAF, positive and negative security models of form items in a request have to be configured by an administrator. However, most applications have lots of forms with each form having multiple items and positive security models of each item are usually different. Therefore, it is time-consuming to configure positive and/or negative security models for a whole application. Furthermore, the WAF administrator may not be familiar with the application which makes it difficult to give a correct positive security model configuration without false-negative or false-positive issues.

An objective of the present invention is to provide a novel method and system for configuring a rule file for a firewall of a Web server, so as to eliminate security vulnerabilities of Web applications and release or at least reduce the burden of manually configuring positive and/or negative security models of form items.

SUMMARY OF THE INVENTION

Accordingly, a first aspect of the present invention provides a method for configuring a rule file for a Web application firewall. The method includes the steps of: blocking, by the Web application firewall computer, a response created by a Web application of a Web server for a browser;

modifying the response to produce a modified response having an added capturing code for capturing at least one regular expression and at least one associated parameter value embedded in the response when the response is executed by the browser;

sending the modified response to the browser;

receiving, by the Web application firewall computer, a request submitted by the browser, wherein the request contains at least one parameter name and at least one associated parameter value;

receiving, by the Web application firewall computer, the at least one regular expression and the at least one associated parameter value captured by the capturing code;

determining, by the Web application firewall computer, a parameter name and a regular expression which are associated with the same parameter value based on (i) the at least one parameter name and the at least one associated parameter value contained in the received request and (ii) the at least one regular expression and the at least one associated parameter value captured by the capturing code; and configuring the rule file of the firewall by use of the determined parameter name and regular expression associated with one another as a filtering rule.

A second aspect of the present invention provides a system for generating a rule file for a firewall. The system includes: a blocking means configured to block a response created by a Web application of the Web server for a browser; a modifying means configured to modify the response by adding capturing code for capturing at least one regular expression and at least one associated parameter value embedded in the response when the response is executed by the browser, wherein the modifying of the response creates a modified response; a sender configured to send the modified response to the browser; a receiver configured to receive (i) a request submitted by the browser that contains at least one parameter name and at least one associated parameter value and (ii) the at least one regular expression and the at least one associated parameter value captured by the capturing code; and a rule determining means configured to (i) determine a parameter name and a regular expression which are associated with the same parameter value based on (a) the at least one parameter name and the at least one associated parameter value contained in the received request and (b) the at least one regular expression and the at least one associated parameter value captured by the capturing code and (ii) configure the rule file of the firewall by use of the determined parameter name and regular expression associated with one another as a filtering rule.

A third aspect of the present invention provides a computer program product embodying computer readable code which, when executed, causes a computer to configure a rule file for a Web application firewall according to the method above.

The present invention proposes defining positive and/or negative security models at a WAF in an automatic way using regular expressions in client site script code. As stated above, client-site script code normally verifies user inputs by use of regular expression matching. The present invention proposes inserting capturing code and capturing a regular expression associated with a parameter value when modified script code is executed by the browser so as to determine an association between a regular expression and a particular parameter value and to determine an association between the particular parameter value and a parameter name. Therefore, the parameter name and the regular expression associated with the same parameter value are determined, thereby configuring the rule file of the firewall using the determined parameter name and regular expression associated with one another as a filtering rule.

At runtime, before submitted to the application server, a user request is passed to the WAF, which checks parameter values corresponding to each parameter name in the user request using a rule associated with the parameter name and regular expression in its rule file, to verify whether the parameter values fit the positive security models and the negative security models therein. If a form item does not fit a security model, the request will be rejected or logged.

Compared with technical solutions in the prior art, according to the present invention, manual configuration is not necessary most of the time so that a regular expression for each form item can be extracted automatically and configurations for positive and negative security models can be performed in an automatic or semi-automatic way. Therefore the burden of configuring positive and negative security models of form items by a WAF administrator can be reduced and mistakes brought by manual configuration can be avoided.

DESCRIPTION OF THE PREFERRED EMBODIMENTS

Embodiments of the present invention will be described hereinafter with reference to the accompanying drawings. It should be noted that same or corresponding reference numerals refer to same or corresponding characteristics or components. Additionally, it should also be noted that representations and descriptions of components and processes irrelevant to the present invention or known to a person having ordinary skill in the art are omitted for clarity.

Figure 1:
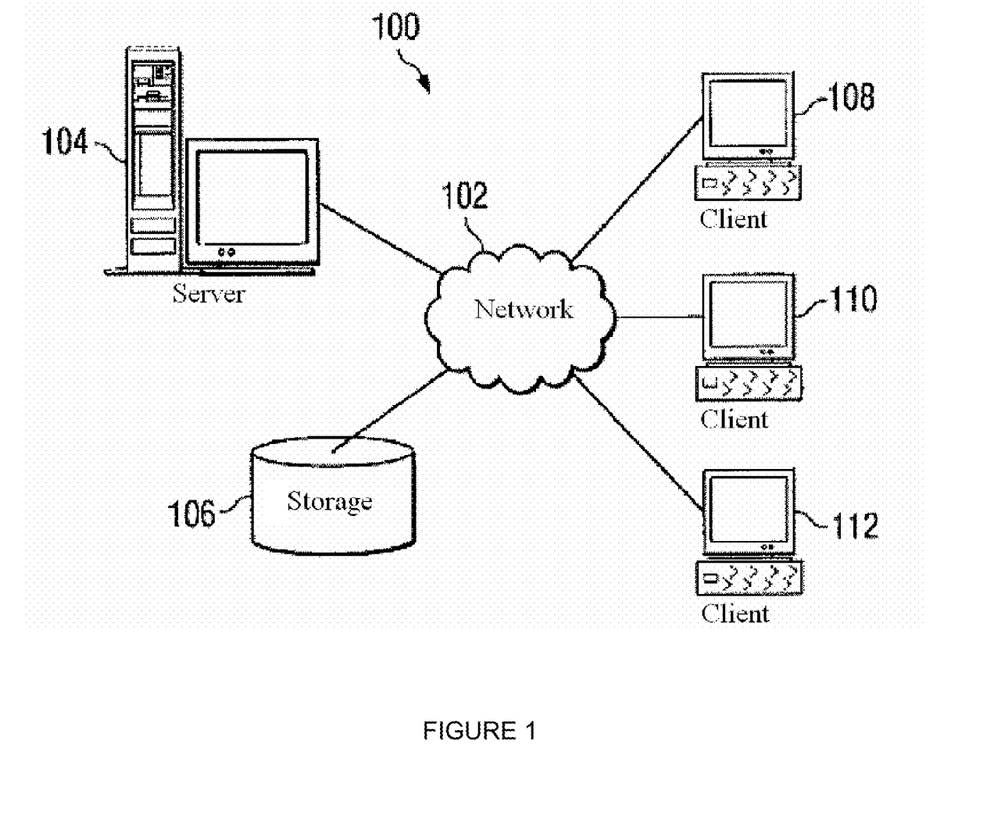
FIG. 1 is a block diagram of a distributed data processing system in which the present invention can be implemented.

FIG. 1 depicts a block diagram of a distributed data processing system in which the present invention can be implemented. A distributed data processing system 100 is a computer network. The distributed data processing system 100 contains a network 102, which is the medium used for providing communication links between various devices and computers connected together within the distributed data processing system 100.

In FIG. 1, a server 104 is connected to the network 102 along with a storage unit 106. In addition, clients 108, 110, and 112, such as workstation, personal computer, cell phone and PDA, also are connected to the network 102. In the depicted example, the server 104 provides data, such as boot files, operating system images, and applications to the clients 108, 110, and 112. The distributed data processing system 100 may include additional servers, clients, and other devices not shown. The distributed data processing system 100 can be the Internet. The network 102 represents a collection of networks and gateways that use the TCP/IP protocol suite to communicate with one another. Of course, the distributed data processing system 100 can also be implemented as a number of different types of networks.

The present invention can be implemented as the data processing system of the sever 104. The data processing system can be a symmetric multiprocessor (SMP) system including a plurality of processors connected to a system bus. Alternatively, a single processor system can be employed. The present invention can also be implemented as the data processing system of the client computers in FIG. 1.

Embodiments of the present invention will be described hereinafter with reference to FIG. 2 and FIG. 3.

Figure 2:
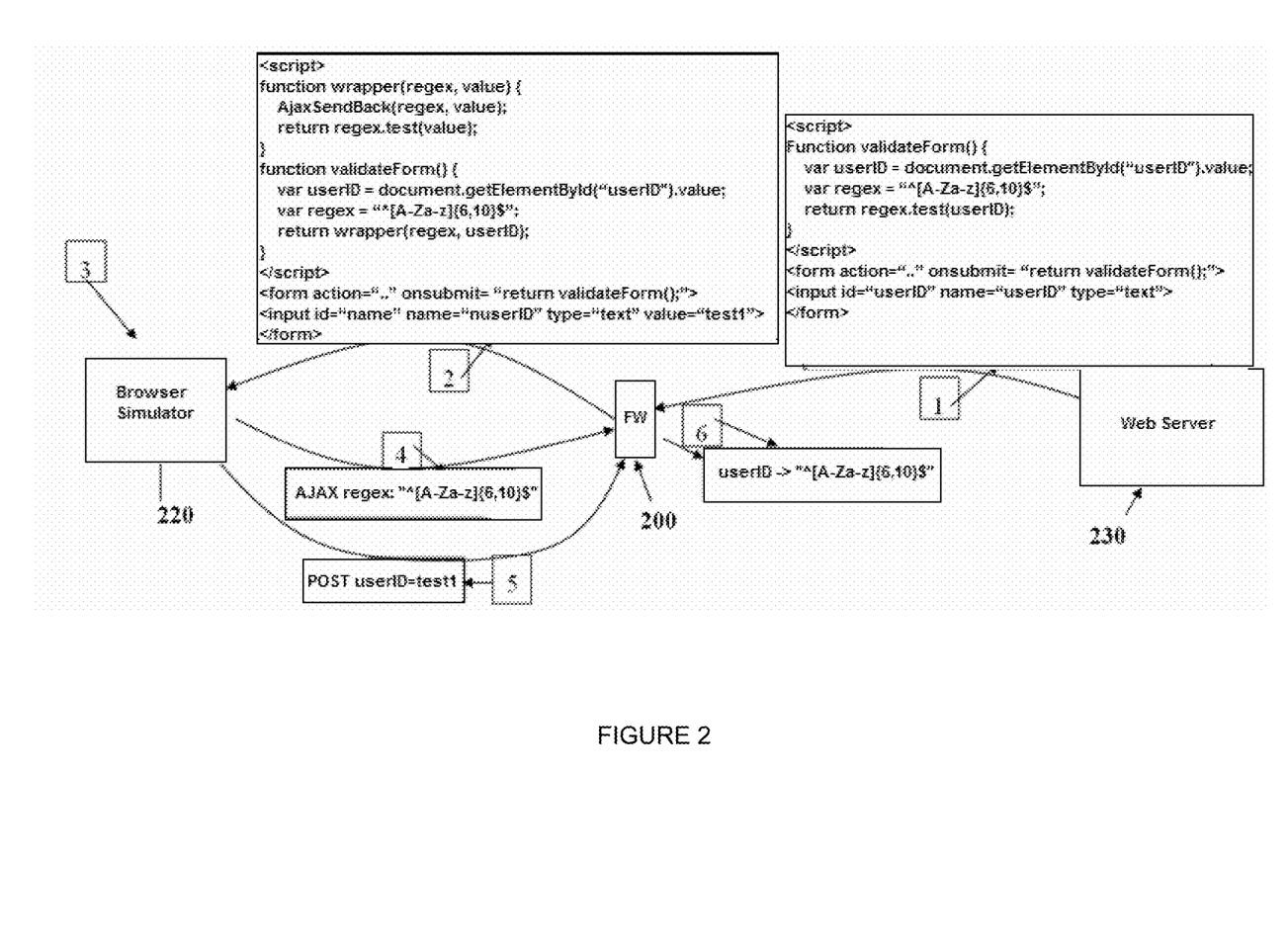
FIG. 2 is a diagram of a firewall configuration system in which a preferred embodiment of the present invention is implemented.

FIG. 2 is a diagram of a firewall configuration system in which a preferred embodiment of the present invention is implemented.

A browser simulator 220 is used to simulate a user browser to execute a regular expression matching command and submit a form. Optionally, the browser simulator 220 may simulate a user browser to set or fill a parameter value in the form.

First, the browser simulator 220 simulates a browser to open a Web file, or enter a URL to input a file request, or click a hypertext link, so as to build a HTTP request. Here, as a client of a Web application, the browser simulator initiates a request by setting up a TCP/IP connection with a particular port at a remote computer. An HTTP server 230 monitoring the port waits for the client to send a request string. Once the request string (and possible information) is received, the server 230 may send back a response string to complete the protocol.

Shown as numeral 1 of FIG. 2, a response is sent to the browser simulator 220 after the response is built by a Web application of the Web server 230. The response is a HTML document. In the preferred embodiment, the response document of HTML page includes the following request information: (i) script, such as JavaScript, embedded with regular expressions for checking user inputs, Function validateForm( ), in which a variable userID and a regular expression, regex, is defined and a matching command is required to be returned, return regex.test(userID); (ii) form submit action, <form action=". . . " onsubmit="return validateForm( );">, and a parameter name and type, <input id="userID" name="userID" type="text">. The above description is shown below in the example HTML page.

```
<script>
Function validateForm( ) {
    var userID = document.getElementById( "userID").value;
    var regex = "^[A-Za-z]{6,10}$";
    return regex.test(userID);
}
</script>
<form action=".." onsubmit= "return validateForm( );">
<input id="userID" name="userID" type="text">
</form>
```

However, it should be understood by those skilled in the art that the response can be a response of other type that supports the Web application.

As shown in FIG. 2, the response first goes to a firewall configuration system 200 according to the present invention between the server 230 and the browser simulator 220. According to the preferred embodiment, the firewall configuration system of the present invention is located between the server 230 and the browser simulator 220, for example, as a proxy server before the server. Alternatively, the firewall configuration system of the present invention may be deployed at the server 230, for example, as a plug-in embedded in the server 230 such as a plug-in of a WAS server or an Apache server.

The firewall configuration system 200 of the present invention parses and modifies the response document. A modified response document is shown as numeral 2 of FIG. 2.

In the modified response document, all (or, designated) regular expression matching commands, e.g., ".test", ".match", etc., and here regex.test, are wrapped with a function and/or code for capturing parameters of the above stated matching commands, regular expression and value to be matched: regex, value, and sending the captured parameters, AjaxSendBack(regex, value). Therefore, the modified response document is added with a function and/or code for capturing a regular expression embedded in the response document for checking user inputs while being executed, function wrapper(regex, value), as in the embodiment.

```
<script>
function wrapper (regex, value) {
    AjaxSendBack(regex, value);
    return regex.test(value);
}
function validateForm( ) {
    var userID = document.getElementById("userID").value;
    var regex = " ^[A-Za-z]{6,10}$";
    return wrapper(regex, userID);
}
</script>
<form action=".." onsubmit= "return validateForm( );">
<input id="name" name="nuserID" type="text" value="test1">
</form>
```

As known to those skilled in the art, a regular expression is code that notes textual rules. The <script> element of a response document created by a Web application is embedded with regular expressions for checking whether user inputs are valid and for string model-matching and/or string model-replacement checking, only at the client side, while users are inputting.

In the above script of the embodiment, line return regex.text(userID) from the original response document is replaced with line return wrapper(regex, userID), which is used to invoke a function function wrapper(regex, value) while being executed. Line function wrapper(regex, value) is used to send captured regular expressions and associated parameter values back to the firewall configuration system using Ajax or other method, AjaxSendBack(regex, value), and perform matching between the regular expressions and associated parameter values, regex.test(value).

Preferably, the firewall configuration system 200 automatically sets a characteristic value for input boxes of all forms at the configuration level, value="test1", shown as numeral 2 of FIG. 2. Therefore, the browser simulator 220 only needs to execute a matching command between regular expressions and associated parameter values. It is unnecessary to enter characteristic values for each parameter name by an administrator. Of course, the present invention can be implemented as the browser simulator 220 automatically or the administrator at the browser simulator 220 manually enters a characteristic value for each input box, after which the matching command between regular expressions and associated parameter values is performed.

Shown as numeral 3 of FIG. 2, the WAF administrator will press a "submit" button directly after a modified response document is sent to the browser simulator 220, or press the "submit" button after checking the auto-entered characteristic values.

Subsequently, the browser simulator 220 checks the parameter values by the "onsubmit" method. As stated above, a regular expression associated with a matching command and a string to be matched (i.e., parameter value) are sent back to the firewall configuration system 200 by Ajax, or other methods, when the added wrapper function, function wrapper (regex, value), is executed. This is shown as numeral 4 of FIG. 2, AJAX regex:"A[A-Za-z]{6, 10}$" value:"test1".

Meanwhile, a request form created by the browser simulator 220 is sent to the firewall configuration system 200, shown as numeral 5 of FIG. 2, POST: userID=test1.

Shown as numeral 6 of FIG. 2, the firewall configuration system 200 thus can determine an association between the regular expression and a particular parameter value based on the regular expression associated with a matching command and a string to be matched (i.e., parameter value). Therefore, it can determine an association between the particular parameter value and a parameter name, as userID in the embodiment, by which the regular expression and parameter name, both associated with the same parameter value, are determined. An example is to determine that it is the userID which is associated with the regular expression "A[A-Za-z]{6, 10}$". Therefore, a positive security model as a rule file of the Web firewall, that is a whitelist which is generally used to define a valid format of a regular expression of each parameter value, is obtained by use of a determined parameter name and a regular expression associated with one another as a filtering rule.

At runtime and before handed to the application server, a user request is passed to the WAF that checks parameter values corresponding to each parameter name in the user request using a rule associated with the parameter name and regular expression in its rule file to verify whether the parameter values contain illegal contents and fits the positive security models and the negative security models. If a form item does not fit a security model, the request will be rejected or logged.

Regular expressions can also be used to build a blacklist. A blacklist is a negative security model generally used to define an invalid format of a regular expression of each parameter value. Therefore, the above stated embodiment can be applied in building a negative security model as long as regular expressions and associated parameter values can be captured and the browser verifies the associated parameter values and submits the form.

In addition, the above embodiment proposes that before executing the matching command, regex.text(userID), the browser simulator may send a regular expression and a parameter values, AjaxSendBack(regex, value), by a separate method. Thus, if the parameter value does not match the regular expression, an invalid form has to be logged at the browser simulator 220 and a new parameter value has to be entered automatically or manually by an administrator at the browser simulator. Since the method "onsubmit" will be reactivated upon reentering, a regular expression and parameter value newly captured by the capturing code will be resent to the firewall configuration system 200 so the original regular expression and parameter value will be discarded. Alternatively, in the event that the parameter value does not match the regular expression, a failure notice may be sent automatically by the browser simulator to the firewall configuration system 200. The firewall configuration system 200 may discard the original regular expression and parameter value and the firewall configuration system 200 is even allowed to designate a new characteristic value.

Preferably, a regular expression and a parameter value may be sent, AjaxSendBack(regex, value), after the matching command, regex.test(userID), is performed by the browser simulator 220 and it is determined that the parameter value matches the regular expression. Optionally, the firewall configuration system 200 may first receive the regular expression and parameter value and then receive the form submitted by the browser simulator, respectively, or to the contrary, receive the form submitted by the browser simulator first. The regular expression and the parameter value may even be sent simultaneously with the browser simulator submitting the form, in this case, Ajax, or other separate method, is not necessary.

Figure 3:
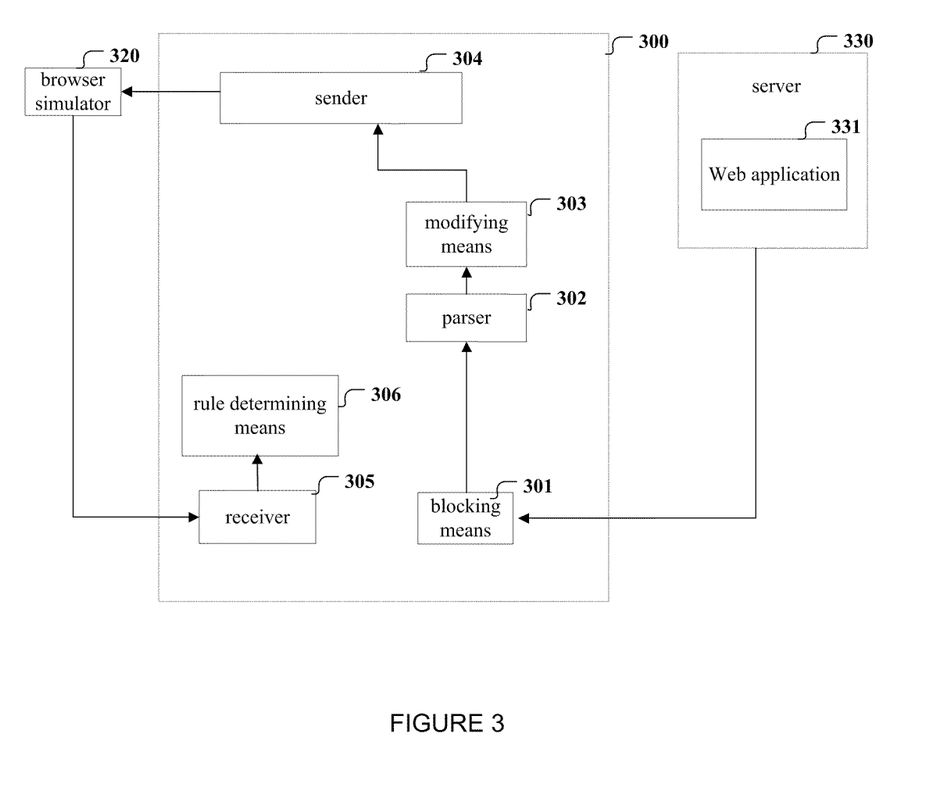
FIG. 3 is a system block diagram of a firewall configuration system according to a preferred embodiment of the present invention.

FIG. 3 is a system block diagram of a preferred embodiment of the present invention. A blocking means 301 of the firewall configuration system 200 blocks a response document created by a certain Web application 331 of the Web server 330. The response document is further parsed by a parser 302, e.g. HTML parser, to a DOM tree containing script objects and text objects such as a common HTML object. A modifying means 303, which is preferably a HTML processor, modifies the parsed response document and adds capturing code. This includes wrapping a regular expression matching command designated in the parsed response document with capturing code for capturing a regular expression associated with the regular expression matching command and a parameter value. The modifying means 303 can be further configured to automatically enter a characteristic value for input boxes in the response document. The modified response document, shown as numeral 2 of FIG. 2, is sent by the sender 304 to the browser simulator 320.

The browser simulator 320 executes the script file in the modified response, including executing a matching command and capturing code. The receiver 305 receives a regular expression and an associated parameter value captured by the capturing code in the modified response (shown as numeral 4 of FIG. 2), and a request submitted by the browser simulator 320 (shown as numeral 5 of FIG. 2) respectively or simultaneously. A rule determining means 306 thus can determine a regular expression and a parameter name associated with the same parameter value (shown as numeral 6 of FIG. 2) based on the above stated association between the regular expression and the parameter value and the association between a parameter name and the parameter value contained in the request. The rule determining means 306 can configure the rule file of the firewall by use of the determined parameter name and regular expression associated with one another as a filtering rule. Although not explicitly described, the firewall configuration system 300 further includes a rule file configuration and a filtering means where the rule file is applied.

In the above embodiment, the browser simulator 320 is used to simulate a user browser to execute a regular expression matching command and submit a form, and can further simulate a user browser to set a parameter value in the form. However, according to the present invention, the browser simulator 320 can be replaced by a common client browser, and the configuration of the firewall filtering rule can be completed step-by-step according to the present invention with requests for different Web applications and different form items of different forms. It is possible in practice to initiate the firewall rule file configuration according to the present invention by determining whether it is the first time for an average client user to request a new form, or its form item, so that the configuration of filtering rule file can be done at real time. For example, it is to determine whether to start with the present invention by allowing a blocking means to be configured to determine whether a response from the server involves a new form or its form item.

Figure 4:
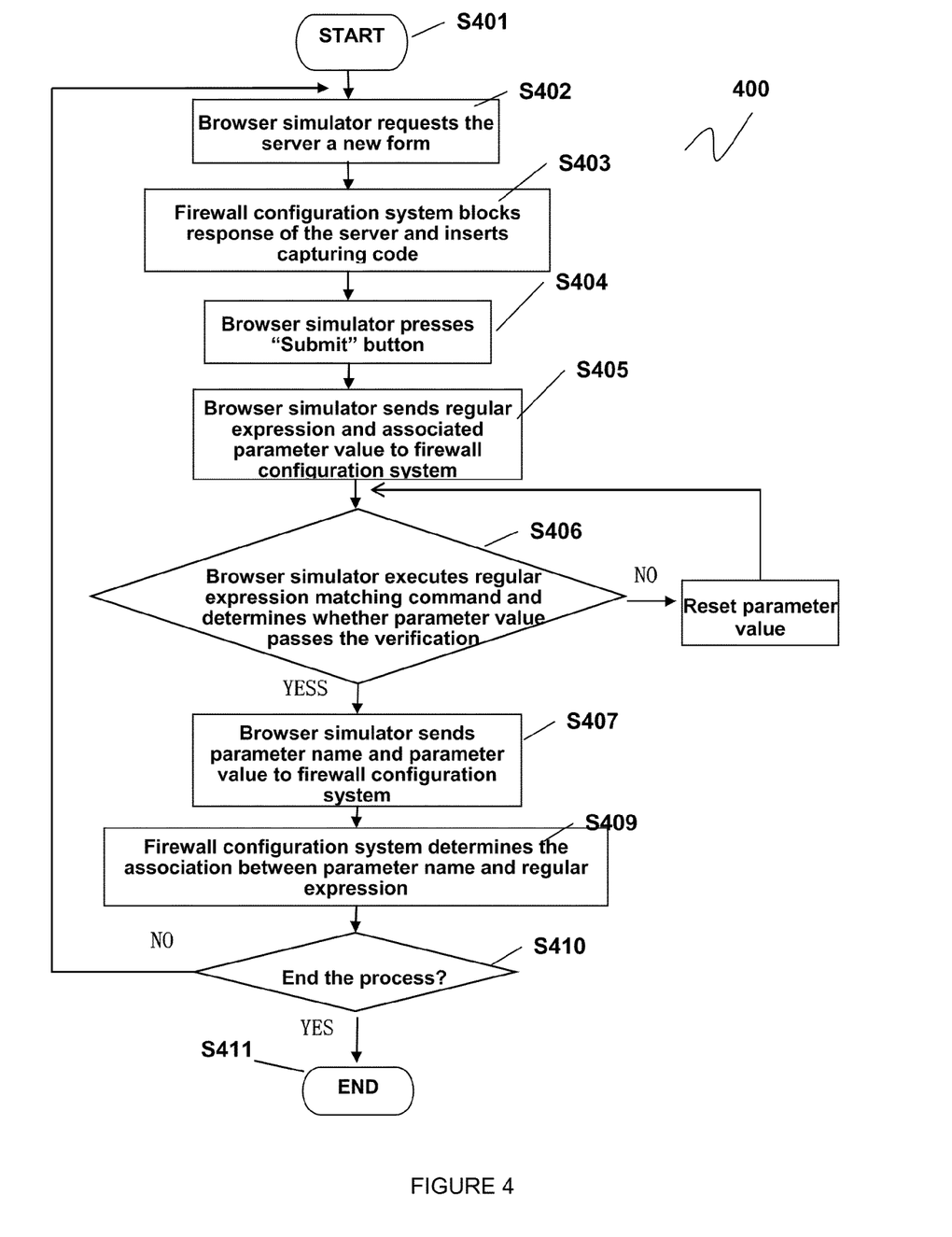
FIG. 4 shows a flow chart of a method according to a preferred embodiment of the present invention.

FIG. 4 shows a flow chart of a method according to a preferred embodiment of the present invention.

After starting at step S401, a browser simulator exploits a page structure tree and requests a new form with the server (step S402). The firewall configuration system blocks a response from the server and inserts capturing code for capturing and sending a regular expression and an associated parameter value (step S403). Optionally, the firewall system may enter a characteristic value for a parameter name of the form automatically. At step S404, the browser simulator may press "submit" button directly or press the "submit" button after the auto-entered characteristic value is checked.

The browser simulator sends a regular expression and an associated parameter value to the firewall configuration system by, for example, Ajax (step S405). The browser simulator executes a regular expression matching command and sends a verified parameter name and parameter value to the firewall configuration system. Alternatively, the parameter name and the parameter value sent by the browser simulator to the server can be blocked by the firewall configuration system (step S406 and S407). Optionally, the regular expression and the associated parameter value are sent when the regular expression matching command is performed by the browser simulator and it is determined that the parameter value passes the verification. Therefore, the order of step S405 and step S406 can be exchanged. In other words, step S405 can be performed after step S407. Further, step S405 can be performed at the same time with step S406 and S407. For example, the regular expression and the associated parameter value can be sent to the firewall configuration system simultaneously with the browser simulator submitting the form. As an example, the regular expression and the associated parameter value can be attached behind the form.

At step S409, determine a regular expression and a parameter name associated with the same parameter value based on the above stated association between the regular expression and a parameter value, and an association between the parameter name and the parameter value. At step S410, determine whether to end the process, and if a security model has to be configured for other (form) requests, and or other applications, return to step S402. If no further configuration is needed, end the process (step S411).

At step S406, if the parameter name and the parameter value do not pass the verification by the regular expression command and thus the request cannot be submitted, an invalid form is logged at the browser simulator 220, and a new parameter value has to be entered manually by an administrator (step S408). Step S406 is performed afterwards to execute the regular expression matching command.

It should be understood to those skilled in the art, each or any step or part of the method and device according to the present invention may be implemented in a computer device, including a processor, storage medium, etc., or a network of computer devices, by hardware, firmware, software or a combination of them.

Based on the above understanding, the objective of the present invention can be achieved by running a program or a group of programs on any information processing device. The information processing device can be a known general purpose computer. Consequently, the objective of the present invention can also be achieved by providing a program product containing program code that implements the method or the device. A storage medium that stores such a program product also constitutes the present invention. The storage medium can be any known storage medium or any storage medium developed in the future.

In the system and method according to the present invention, each part or step can be decomposed and/or re-combined. Such decomposition and/or re-combination should be seen as an equivalent solution of the present invention. Furthermore, the steps performing the above series of processes may, but not necessarily, be performed chronologically in the natural order of the description. Some steps can be performed in parallel or independently of one another.

Preferred embodiments of the present invention are described above. It should be understood by those skilled in the art that the protection scope of the present invention is not limited to the particular details disclosed here but may include various alternations and equivalents within the actual scope of the spirit of the present invention.

What is claimed is:

1. A method for configuring a rule file for a Web application firewall computer, the method comprising the steps of:
    blocking, by the Web application firewall computer, a response created by a Web application of a Web server for a browser;
    modifying the response to produce a modified response having an added capturing code for capturing at least one regular expression and at least one associated parameter value embedded in the response when the response is executed by the browser;
    sending the modified response to the browser;
    receiving, by the Web application firewall computer, a request submitted by the browser, wherein the request contains at least one parameter name and at least one associated parameter value;
    receiving, by the Web application firewall computer, the at least one regular expression and the at least one associated parameter value captured by the capturing code;
    determining, by the Web application firewall computer, a parameter name and a regular expression which are associated with the same parameter value based on (i) the at least one parameter name and the at least one associated parameter value contained in the received request and (ii) the at least one regular expression and the at least one associated parameter value captured by the capturing code; and
    configuring the rule file of the firewall by use of the determined parameter name and regular expression associated with one another as a filtering rule;
    wherein the at least one associated parameter value is reset at the browser side after a previous parameter value fails to pass verification by the browser and therefore the response fails to be submitted.

2. The method of claim 1, wherein the browser is a general-purpose client browser or a browser simulator used to simulate a general-purpose client browser.

3. The method according to claim 1, wherein the modified response having an added capturing code is produced by:
    parsing the response; and
    wrapping at least one regular expression matching command designated in the response with the capturing code for capturing the at least one regular expression associated with the at least one regular expression matching command and capturing the at least one associated parameter value.

4. The method of claim 1, wherein the step of modifying the response further comprises the step of:
    setting the at least one associated parameter value for at least one parameter name in the response.

5. The method of claim 1, wherein the at least one associated parameter value is set at the browser side after the step of sending the modified response to the browser.

6. The method of claim 1, wherein the capturing code is further used to send the at least one regular expression and the at least one associated parameter value while the response is being executed at the browser.

7. The method of claim 1, wherein the step of receiving the request submitted by the browser is performed before the step of receiving the at least one regular expression and the at least one associated parameter value captured by the capturing code.

8. The method of claim 1, wherein the step of receiving the at least one regular expression and the at least one associated parameter value captured by the capturing code is performed before the step of receiving the request submitted by the browser.

9. The method of claim 1, wherein the at least one regular expression and the at least one associated parameter value captured by the capturing code are received along with the request received from the browser.

10. A system for configuring a rule file for a firewall, the system comprising:
    a blocking means configured to block a response created by a Web application of the Web server for a browser;
    a modifying means configured to modify the response by adding capturing code for capturing at least one regular expression and at least one associated parameter value embedded in the response when the response is executed by the browser, wherein the modifying of the response creates a modified response;
    a sender configured to send the modified response to the browser;
    a receiver configured to receive (i) a request submitted by the browser that contains at least one parameter name and at least one associated parameter value and (ii) the at least one regular expression and the at least one associated parameter value captured by the capturing code; and
    a rule determining means configured to (i) determine a parameter name and a regular expression which are associated with the same parameter value based on (a) the at least one parameter name and the at least one associated parameter value contained in the received request and (b) the at least one regular expression and the at least one associated parameter value captured by the capturing code and (ii) configure the rule file of the firewall by use of the determined parameter name and regular expression associated with one another as a filtering rule;
    wherein the at least one associated parameter value is reset at the browser side after a previous parameter value fails to pass verification by the browser and therefore the response fails to be submitted.

11. The system of claim 10, wherein the browser is a general-purpose client browser or a browser simulator used to simulate a general-purpose client browser.

12. The system of claim 10, further comprising:
    a parser configured to parse the blocked response to create a parsed response;
    wherein the modifying means is further configured to wrap at least one regular expression matching command designated in the parsed response with the capturing code for capturing the at least one regular expression associated with the at least one regular expression matching command and at least one parameter value.

13. The system of claim 10, wherein the modifying means is further configured to set the at least one associated parameter value for at least one parameter name in the response.

14. The system of claim 10, wherein the capturing code is further used to send the at least one regular expression and the at least one associated parameter value while being executed.

15. The system of claim 10, wherein the receiver is further configured to receive the request submitted by the browser and the at least one regular expression and the at least one associated parameter value captured by the capturing code, respectively.

16. The system of claim 10, wherein the receiver is further configured to receive the at least one regular expression and the at least one associated parameter value along with the request submitted by the browser.

17. A non-transitory, computer readable storage medium having computer readable code stored thereon which, when executed, causes a computer to implement a method of configuring a rule file for a Web application firewall, the method comprising:

blocking, by the Web application firewall computer, a response created by a Web application of a Web server for a browser;

modifying the response to produce a modified response having an added capturing code for capturing at least one regular expression and at least one associated parameter value embedded in the response when the response is executed by the browser;

sending the modified response to the browser;

receiving, by the Web application firewall computer, a request submitted by the browser, wherein the request contains at least one parameter name and at least one associated parameter value;

receiving, by the Web application firewall computer, the at least one regular expression and the at least one associated parameter value captured by the capturing code;

determining, by the Web application firewall computer, a parameter name and a regular expression which are associated with the same parameter value based on (i) the at least one parameter name and the at least one associated parameter value contained in the received request and (ii) the at least one regular expression and the at least one associated parameter value captured by the capturing code; and configuring the rule file of the firewall by use of the determined parameter name and regular expression associated with one another as a filtering rule wherein the at least one associated parameter value is reset at the browser side after a previous parameter value fails to pass verification by the browser and therefore the response fails to be submitted.

* * * * *